(12) United States Patent
Enmeiji

(10) Patent No.: US 6,554,084 B1
(45) Date of Patent: Apr. 29, 2003

(54) HYDRAULICALLY DRIVEN FORKLIFT

(75) Inventor: Yoshiyuki Enmeiji, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 09/743,226

(22) PCT Filed: May 8, 2000

(86) PCT No.: PCT/JP00/02944

§ 371 (c)(1),
(2), (4) Date: Jan. 4, 2001

(87) PCT Pub. No.: WO00/68134

PCT Pub. Date: Nov. 16, 2000

(30) Foreign Application Priority Data

May 7, 1999 (JP) .......................... 11-126499
May 7, 1999 (JP) .......................... 11-126500

(51) Int. Cl.⁷ ..................... B62D 11/04; F16H 61/40
(52) U.S. Cl. ............... 180/6.24; 180/6.48; 180/307; 180/308
(58) Field of Search ............... 180/6.24, 6.3, 180/6.48, 6.62, 6.64, 305, 307, 308, 242

(56) References Cited

U.S. PATENT DOCUMENTS

| | | | | |
|---|---|---|---|---|
| 2,598,865 A | * | 6/1952 | Turner | |
| 2,651,377 A | * | 9/1953 | Lapsley et al. | |
| 3,005,562 A | * | 10/1961 | Shaffer | |
| 3,315,759 A | * | 4/1967 | Bohlen | |
| 3,827,528 A | * | 8/1974 | Shaffer | |
| 3,858,675 A | * | 1/1975 | Geis | |
| 4,325,442 A | * | 4/1982 | Groenig | 180/6.48 |
| 4,366,671 A | * | 1/1983 | Chichester | 180/307 |
| 4,986,387 A | | 1/1991 | Thompson et al. | 180/212 |
| 6,283,237 B1 | * | 9/2001 | Muller | 180/6.48 |

FOREIGN PATENT DOCUMENTS

| | | |
|---|---|---|
| JP | 57-177876 | 7/1956 |
| JP | 48-11723 | 2/1973 |
| JP | 62-18335 | 1/1987 |
| JP | 1-168580 | 7/1989 |
| JP | 2-48476 | 4/1990 |
| JP | 11-92094 | 4/1999 |

* cited by examiner

Primary Examiner—Anne Marie Boehler
(74) Attorney, Agent, or Firm—Fildes & Outland, P.C.

(57) ABSTRACT

Front wheels (3A, 3B) are operably connected to hydraulic motors (21A, 21B), and hydraulic pumps (26A, 26B) driven by an engine (25) are provided, each hydraulic pump (26A, 26B) being connected to one of the hydraulic motors (21A, 21B). Control of speed is effected by switching the direction of oil flow from the hydraulic pumps (26A, 26B), changing the direction of rotation of the hydraulic motors (21A, 21B), controlling the rpm of the engine (25) and the flow rate of oil from the hydraulic pumps (26A, 26B), and changing the rpm's of the hydraulic motors (21A, 21B). Control of turning is made possible by controlling, based on the turning angle of a steering wheel or the turning angles of the rear wheels, the respective rotation speeds (equal or different) or the respective directions of rotation (same or opposite) of the front wheels (3A, 3B). Provided is a hydraulically driven forklift employing a 2-pump 2-motor system, which improves maneuverability and reduces the turning radius.

6 Claims, 6 Drawing Sheets

FIG.6
(A) 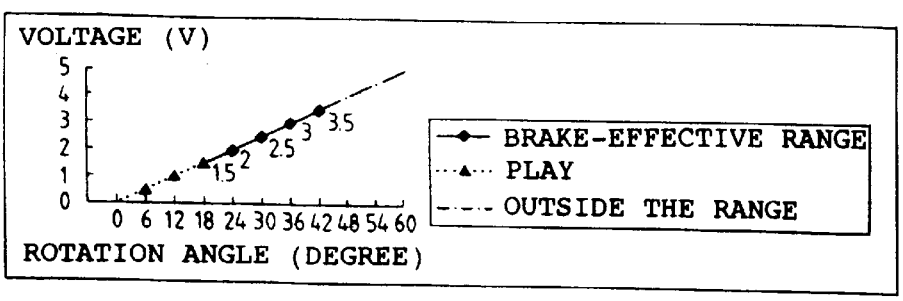
(B) 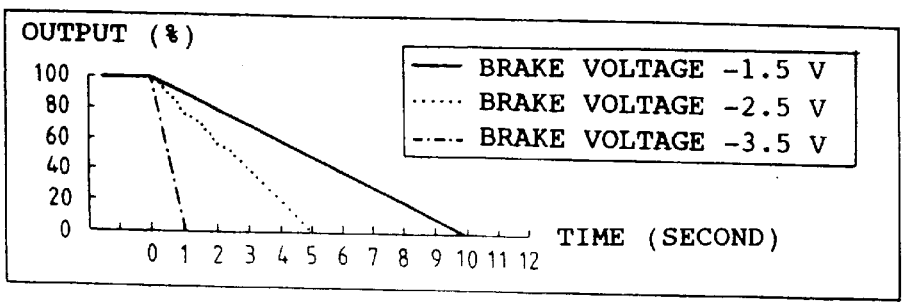
(C) 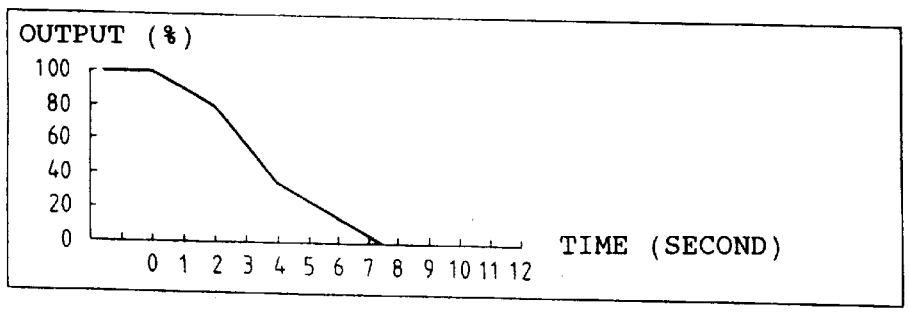
(D) 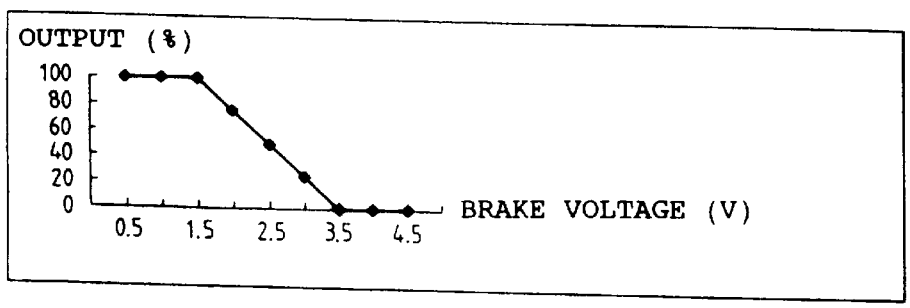
(E) 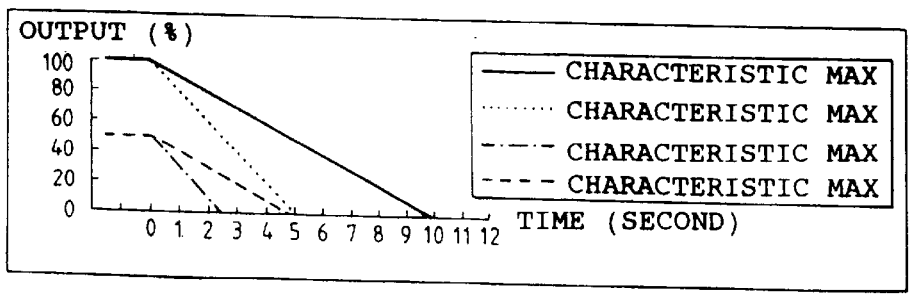

HYDRAULICALLY DRIVEN FORKLIFT

TECHNICAL FIELD

The present invention relates to an engine type forklift employing a hydraulic driving system.

BACKGROUND ART

Heretofore, main power transmission devices for general engine type forklifts have been of a clutch type and a torque converter type; besides this, there is also an engine type forklift employing a hydraulic driving system. This engine type forklift employing a hydraulic driving system is available as a 1-pump 1-motor type, a 1-pump 2-motor type, etc., of which characteristics include high efficiency and unnecessitation of front differentials. As for the turning system, rear wheels are turned for direction change.

Further, conventional general forklifts have a center of gravity positioned at a higher level than in the case of automobiles and have a cradle mechanism, with the result that they have so low turning stability that they could overturn if they make a sharp turn at high speed. As an example of countermeasures therefor, the amount of cradling is controlled according to speed. Further, since the overturning during a turn occurs more often when the traveling speed is high or when the turn is sharp, it is advisable to reduce the traveling speed during the turn; however, the operator's will (the amount by which the accelerator pedal is pressed) is involved in this case, so that mistakes in operation tend to arise. Accordingly, there has been provided a system for automatically controlling the traveling speed, which feeds back the turning angle of the steering wheel and uses an electronic governor or the like to change the engine rpm (revolution per minute).

However, according to the conventional arrangement described above, the use of a pump shared by the right and left front wheels that are driving wheels results in poor maneuverability and in an increased turning radius. Further, according to a system for controlling the traveling speed during a turn by changing the engine rpm, the mechanism becomes complicated and the traveling speed cannot be optionally set.

Further, the brake system is of a type in which a drum brake is attached to the front hub as in a usual forklift, presenting problems from the standpoint of cost and space. Further, it cannot be used in the form in which hydraulic motors are attached directly to the front wheels.

DISCLOSURE OF THE INVENTION

Accordingly, a first object of the present invention is to provide a hydraulically driven forklift employing a 2-pump 2-motor type, which makes it possible to improve maneuverability and to reduce the turning radius.

A second object of the invention is to provide a hydraulically driven forklift capable of using a hydraulic brake provided by a hydraulic drive system as a service brake.

In order to achieve the first object mentioned above, the invention provides a hydraulically driven forklift having a vehicle body provided with a pair of right and left front wheels and a pair of right and left rear wheels, and a mast and forks disposed at the front end of the vehicle body, characterized in that the front wheels are respectively operably connected to the drive shafts of hydraulic motors attached to the vehicle body, the vehicle body is provided with a plurality of hydraulic pumps driven by an engine, each hydraulic pump corresponding to and being connected to one of the hydraulic motors, and the rear wheels are provided to be turnable around vertical axes with respect to the vehicle body.

According to the above arrangement of the invention, the control of speed in longitudinal travel can be effected by switching the directions of oil flow from the both hydraulic pumps by a change lever, changing the direction of rotation of each hydraulic motor, and controlling the rpm of the engine and the flow rates of oil from the hydraulic pumps by an accelerator pedal, thereby changing the rpm's of the hydraulic motors. And the control of turning is made possible by controlling, based on the turning angle of a steering wheel or of the turning angles of the rear wheels, the respective rotation speeds (equal or different) or the respective directions of rotation (same or opposite) of the right and left front wheels.

Further, it is possible to improve maneuverability and reduce the turning radius by employing a 2-pump 2-motor type hydraulic drive system (HST system) as the drive system for the forklift, and separately controlling the right and left front wheels which are drive wheels. And it is possible to simplify the power transmission system and increase the degree of flexibility of layout by respectively attaching the front wheels directly to the hydraulic motors attached to the vehicle body. Further, high efficiency and unnecessitation of a front differential, which are the characteristics of the hydraulic driving system, can be expected; and besides, low fuel consumption due to optimum control of the engine can be expected.

A preferred embodiment of the invention is characterized in that the change of traveling speed during a turn is made by controlling the rpm's of the hydraulic motors according to the turning angle of the steering wheel.

According to this preferred embodiment, the traveling speed during a turn can be automatically changed by controlling the rpm's of the hydraulic motors according to the turning angle of the steering wheel without changing the rpm of the engine. And the arrangement can be simplified and the traveling speed during the turn can be optionally set independently of the accelerator pedal.

The preferred embodiment of the invention is also characterized in that the change of traveling speed during the turn can be made by controlling the rpm's of the hydraulic motors according to the turning angle of the rear wheels.

According to this preferred embodiment, the traveling speed during the turn can be automatically changed by controlling the rpm's of the hydraulic motors according to the turning angle of the rear wheels without changing the rpm of the engine. And the arrangement can be simplified and the traveling speed during the turn can be optionally set independently of the accelerator pedal.

To achieve the second object mentioned earlier, another embodiment of the invention is characterized in that the hydraulic pumps are of an electrically controlled type arranged to control swash plate angles based on a travel instruction signal from a controller, the arrangement being such that the travel instruction signal is emitted from the controller into the hydraulic pumps by feeding into the controller a detection signal from a detector for detecting an amount of travel of a brake pedal.

According to this embodiment, when the brake pedal is pressed, the amount of travel thereof is detected by the detector and the detection signal is fed into the controller, whereupon a travel instruction signal is emitted from the controller according to the detection signal into the hydraulic pumps, thus controlling the swash plate angles of the hydraulic pumps. That is, braking can be effected by controlling the speed at which the swash plate angles of the hydraulic pumps are returned to 0° according to the amount of travel of the brake pedal. On this occasion, it is arranged that the swash plate angles of the hydraulic pumps become 0° a little before a stroke end of the brake pedal, and at the stroke end, parking brakes built in the hydraulic motors can also be actuated.

Therefore, hydraulic brakes provided by the hydraulic drive system can be used effectively as the service brake, which is suitable from the viewpoint of cost and space. This arrangement is also applicable to a type where the hydraulic motors are directly attached to the front wheels. Further, as in ordinary torque converter type forklifts, inching operation can also be effected by using the brake pedal.

BRIEF DESCRIPTION OF THE DRAWINGS

FIG. 6 shows control diagrams of the hydraulically driven forklift.

BEST MODE FOR EMBODYING THE INVENTION

Figure 1:
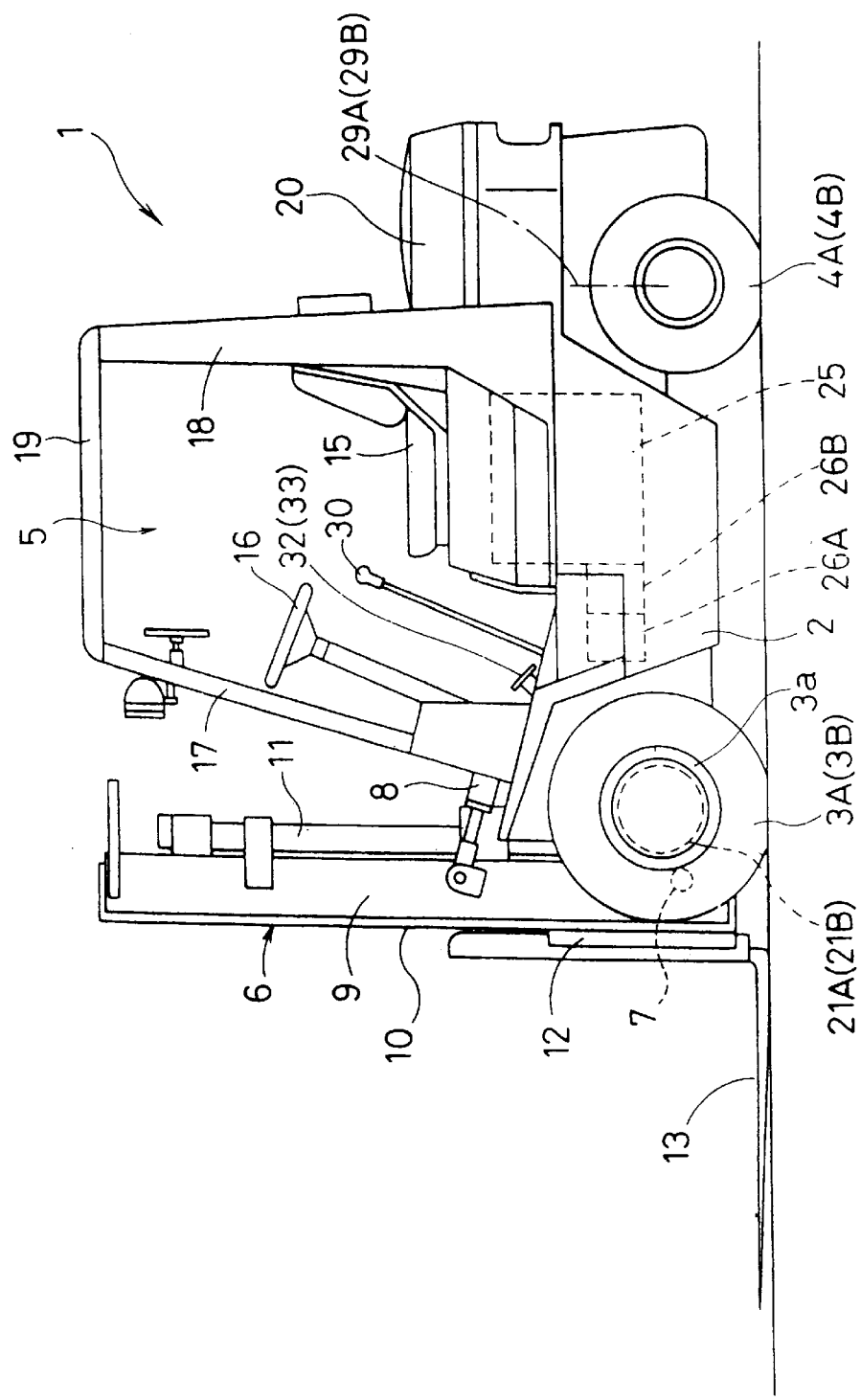
FIG. 1 is a side view of a hydraulically driven forklift, showing a first embodiment of the invention.

A first embodiment of the invention will now be described with reference to FIGS. 1 through 4.

A forklift 1 is provided with a pair of right and left front wheels (driving wheels) 3A and 3B in the front of a vehicle body 2 and a pair of right and left rear wheels (direction change wheels) 4A and 4B in the rear. And a driver's room 5 is installed in an upper front region of the vehicle body 2. A vertically extensible mast 6 is attached to the front end of said vehicle body 2 in such a manner that said mast 6 is turnable back and forth through a connecting shaft 7 extending widthwise of the vehicle, and a tilt cylinder 8 for back and forth turning movement is installed between the vehicle body 2 and the mast 6.

Said mast 6 comprises a pair of right and left outer frames 9 on the vehicle body 2 and a pair of right and left inner frames 10 capable of up and down movement as they are guided by said outer frames 9. And a lift cylinder 11 is installed between the outer and inner frames 9 and 10. Further, a lift bracket 12 is installed, which is capable of up and down movement as it is guided by the inner frames 10, said lift bracket 12 having a pair of right and left forks 13 installed thereon through a pair of upper and lower finger bars.

Disposed in the driver s room 5 are a seat 15, a steering wheel 16 positioned forwardly of the seat 15. And a head guard 19 is disposed over driver's room 5 through front pipes 17 and rear pipes 18 erected from the vehicle body 2. And a counterweight 20 is disposed on the main body 2 rearwardly of the seat 15.

The pair of right and left front wheels 3A and 3B have rims 3a which are respectively attached directly to rotary flanges (a kind of driving shafts) 22A and 22B of hydraulic motors 21A and 21 B through fasteners 23A and 23B, whereby the front wheels 3A and 3B are operably connected to the hydraulic motors 21A and 21B. And the mounts of the hydraulic motors 21A and 21B are fixed on the vehicle body 2, i.e., a front frame.

Said vehicle body 2 is provided with an engine 25. The engine 25 has a pair (a plurality) of hydraulic pumps (HST tandem pumps) 26A and 26B directly attached thereto. The mounting method on this occasion is such that they are rubber-mounted by the engine 25 and the frame. And the hydraulic pumps 26A and 26B and the hydraulic motors 21A and 21B, corresponding to each other, are interconnected through piping (such as hydraulic hoses) 27A and 27B in such a manner that each of the hydraulic pumps 26A, 26B corresponds to one of the hydraulic motors 21A, 21B, that is, a 2-pump 2-motor type hydraulically driven system (HST system) is established.

The pair of right and left rear wheels 4A and 4B are installed on the vehicle body 2 such that they are turnable respectively around vertical axes 29A and 29B. The numeral 30 denotes an electric type change lever; 31 denotes a controller; 32 denotes an electric type accelerator pedal; and 33 denotes an electric type brake pedal.

The operation of the first embodiment described above will be described below.

Figure 2:
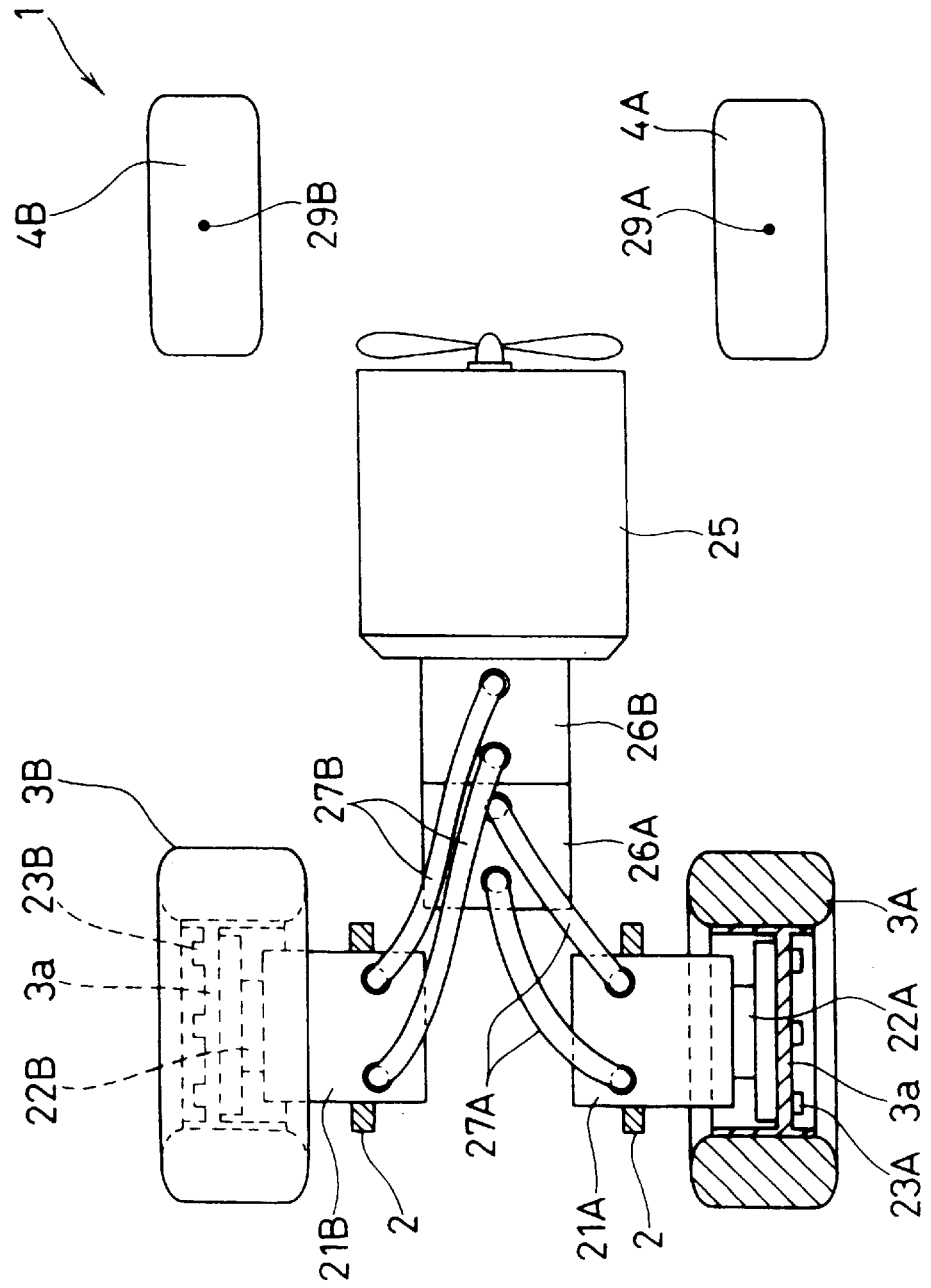
FIG. 2 is a plan view, partly broken away, showing wheel regions of the hydraulically driven forklift.
Figure 3:
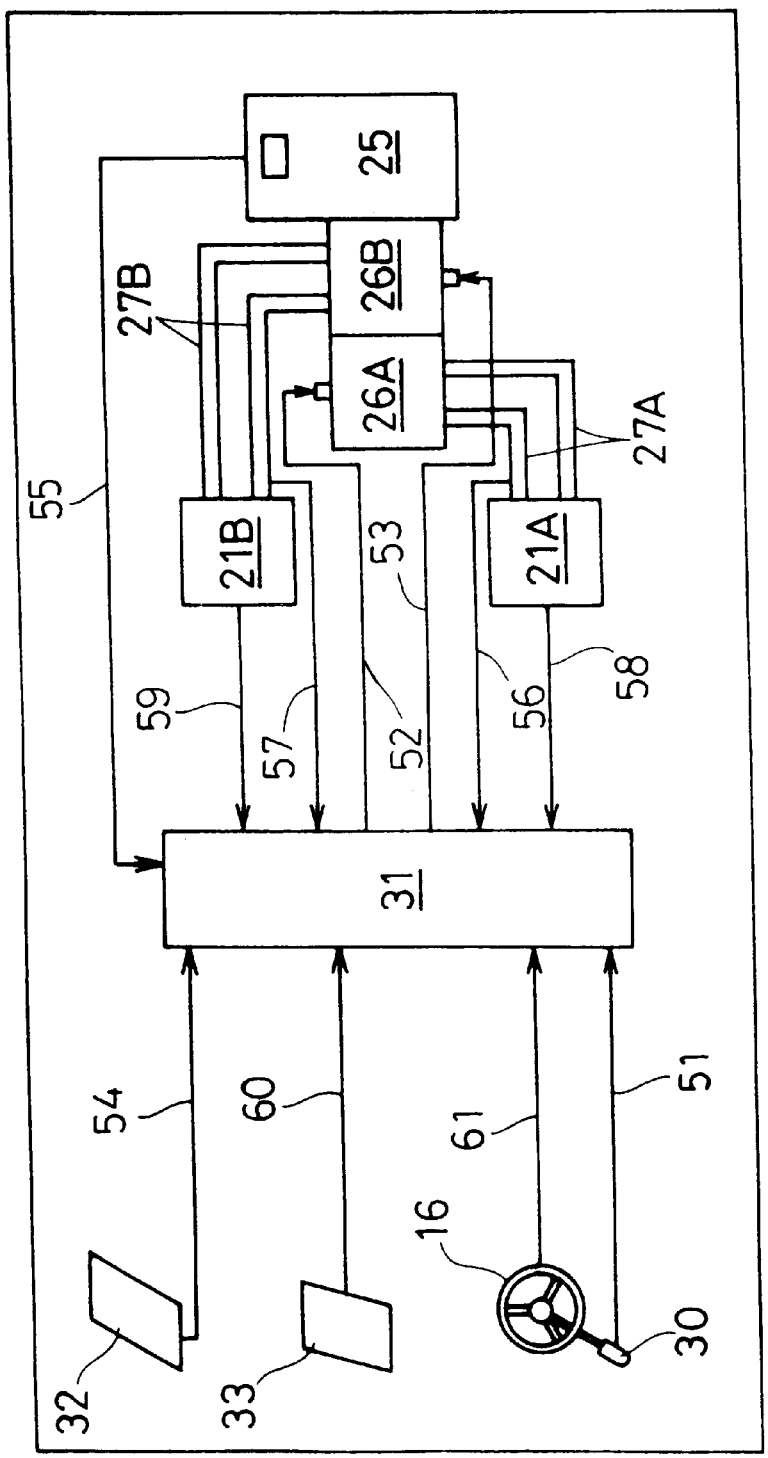
FIG. 3 is a system block diagram of the hydraulically driven forklift.
Figure 4:
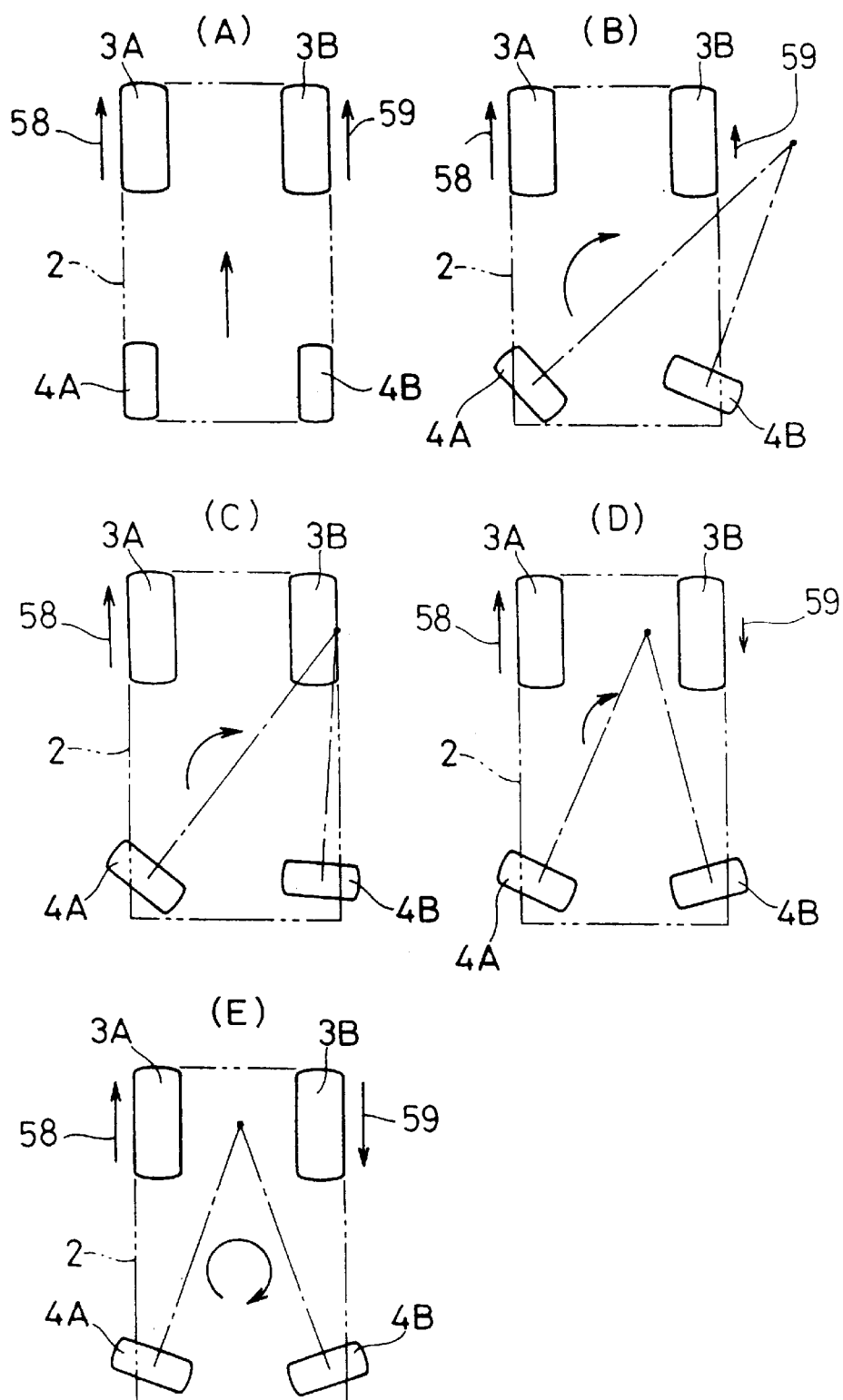
FIG. 4 is a schematic plan view for explaining how to steer the hydraulically driven forklift.

FIGS. 1, 2 and (A) of FIG. 4 show an ordinary longitudinal travel. At this time, the right and left front wheels 3A and 3B and right and left rear wheels 4A and 4B face in the longitudinal direction. And longitudinal travel is effected by the change lever 30. A longitudinal travel signal 51 is fed into the controller 31 and the directions of oil flow in the hydraulic pumps 26A and 26B are switched by travel instructions 52 and 53 fed through the controller 31, thereby changing the directions of rotation of the hydraulic. motors 21A and 21B.

Further, a vehicle speed instruction signal 54 is fed into the controller 31 by means of the accelerator pedal 32, thereby controlling the rpm 55 of the engine 25 and the oil pressures (flow rates of oil) from the hydraulic pumps 26A and 26B, thus changing the rpm's 58 and 59 of the hydraulic motors 21A and 21B so as to control the speed. In addition, stoppage or the like can be effected by feeding a brake signal 60 into the controller 31 by the brake pedal 33.

The control of turning is effected by an operator sitting on the seat 15 in the driver's room 5 and operating the steering wheel 16, and on this occasion the turning radius can be changed by controlling swash plates of the hydraulic pumps 26A and 26B by a position signal 61 resulting from the turning angle of the steering wheel 16 and controlling the rpm's 58 and 59 and the direction of rotation of hydraulic motors 21A and 21B.

That is, the turning radius can be changed by controlling the rpm's 58 and 59 and the direction of rotation of both hydraulic motors 21A and 21B according to the turning angle of the steering wheel 16, as follows.

a: In the case where the steering wheel 16 is in a neutral position, as shown in (A) of FIG. 4, the rpm's 58 and 59 of the right and left hydraulic motors 21A and 21B are the same, with the vehicle moving in a straight line.

b: In the case where the turning angle of the steering wheel (the position signal 61) is small, as shown in (B) of FIG. 4, the directions of rotation for the right and left are the same and there is a difference between the rpm's 58 and 59 for the right and left (for example, 58>59).

c: In the case where the turning angle of the steering wheel (the position signal 61) is at a medium level, as shown in (C) of FIG. 4, the front wheel on one side alone is rotated (for example, the left-hand side front wheel 3A alone is rotated).

d: In the case where the turning angle of the steering wheel (the position signal 61) is above said medium level, as shown in (D) of FIG. 4, the right and left wheels are rotated in opposite directions and there is a difference between the rpm's 58 and 59 for the right and left (for example, 58>59).

e: In the case where the turning angle of the steering wheel (the position signal 61) is at a maximum (the steering wheel locked against the end), as shown in (E) of FIG. 4, with rotations for the right and left are in opposite directions and the rpm's 58 and 59 for the right and left are the same. In this case, the turning radius can be minimized.

In the above, (B) of FIG. 4 to (E) of FIG. 4 show rightward turns; however, leftward turns are also made in the same manner by reversing the turning direction of the steering wheel 16. Further, while they show forward travel, backward travel is also effected in the same manner. And at the time of rightward and leftward turns, the right and left rear wheels 4A and 4B, when they are of a turning caster type, are turned for the change of direction in a follow-up manner. Further, the relation between the turning angle of the steering wheel 16 and the rpm's 58 and 59 of the right and left hydraulic motors 21A and 21B can be optionally changed according to the setting of the controller 31.

Further, when the turning angle of the steering wheel 16 corresponds to a sharp turn to exceed a certain value (for example, a pivot turn in which one wheel alone rotates), the upper limits of the rpm's 58 and 59 of the hydraulic motors 21A and 21B are automatically controlled independently of the accelerator pedal 32. That is, while speed can be controlled by the accelerator pedal 32 up to the rpm's 58 and 59 of the hydraulic motors 21A and 21B set for sharp turns, the rpm's are controlled so as not to exceed the set values. The methods therefor include the following.

In the case of 1-speed fixed motors: the turning angle of the steering wheel 16, and the rpm's 58 and 59 of the hydraulic motors 21A and 21B are inputted by the controller 31 to control the swash plates of hydraulic pumps 26A and 26B.

In the case of 2-speed capacity switching motors: when the turning angle of the steering wheel 16 exceeds a certain value, the capacity switching of the hydraulic motors 21A and 21B is controlled so that first speed alone is used for rotation and the rpm's 58 and 59 are limited.

Since the 2-pump 2-motor type hydraulic driving system (HST system) is employed as the driving system for the forklift 1, as described above, turning can be effected by the front wheels 3A and 3B; there is no need to use the rear wheels 4A and 4B for steering. If the tires are rigid, however, they will slip during the turn. In this case, however, the use of the turning caster system makes it possible to follow up the forward or backward movement or turning of the front wheels 3A and 3B.

Further, the 2-pump 2-motor type hydraulic drive system (HST system) is employed as the drive system for the forklift 1, and the right and left front wheels 3A and 3B which are the driving wheels are separately controlled, thereby making it possible to improve maneuverability and reduce the turning radius. And the front wheels 3A and 3B are respectively directly attached to the hydraulic motors 21A and 21B attached to the vehicle body 2, thereby making it possible to simplify the power transmission and to increase the degree of flexibility of layout. Further, high efficiency and the unnecessitation of a front differential, which are the characteristics of the hydraulic drive system, can be expected; and besides, low fuel consumption due to optimum control of the engine can be expected.

In this forklift 1, the operator sitting on the seat 15 in the driver's room 5, for example, operates a lift lever to actuate the lift cylinder 11, whereby the forks 13 can be raised and lowered along the mast 6 through the lift bracket 12, etc.; thus, the intended fork work can be done. Further, a tilt lever is operated to actuate the tilt cylinder 8, whereby the mast 6 can be turned (tilted) around the connecting shaft 7; thus, the position of the forks 13 can be changed through the lift bracket 12, etc.

Figure 5:
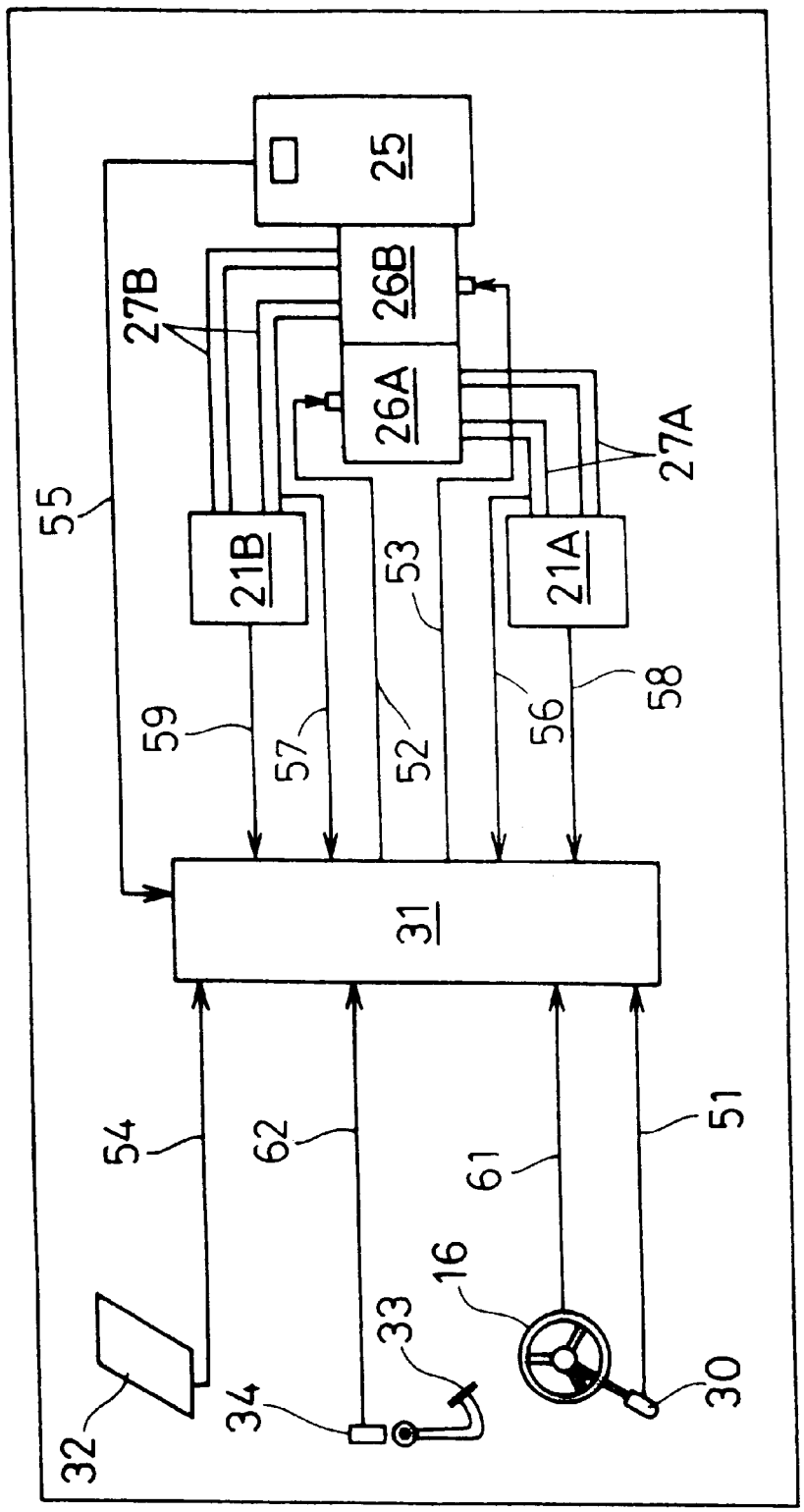
FIG. 5 is a system block diagram of a hydraulically driven forklift, showing a second embodiment of the invention.

Next, a second embodiment of the invention will be described with reference to FIGS. 5 and 6.

In this second embodiment, the overall arrangement is the same as in the first embodiment described above (FIGS. 1, 2, 4). In this second embodiment, a rotation sensor 34 is attached at the center of rotation of the electric type brake pedal 33. And the hydraulic pumps 26A and 26B are adapted to be electrically controlled such that the swash plate angles are controlled by travel instruction signals 52 and 53 from the controller 31.

Said rotation sensor 34 is an example of a detector for detecting the amount of travel of the brake pedal 33, and for such means, there may be employed a stroke sensor or the like. And it is arranged that travel instruction signals 52 and 53 are sent from the controller 31 to the hydraulic pumps 26A and 26B by feeding a brake signal (detection signal) 62 from the rotation sensor 34 into the controller 31.

In this second embodiment, stoppage or the like can be effected by feeding the brake signal 62 into the controller 31 according to the amount of travel of the brake pedal 33.

That is, the hydraulic brake by the hydraulic drive system works when the swash plate angle of the hydraulic pump takes the value 0°. Therefore, the electrically controlled hydraulic pumps 26A and 26B are used and are electrically operably connected to the brake pedal 33. When this brake pedal 33 is pressed, the swash plate angles of the hydraulic pumps 26A and 26B are controlled so that they become 0°. However, if the swash plate angles of the hydraulic pumps 26A and 26B should become 0° as soon as the brake pedal 33 is pressed, hard braking will result and the feeling will greatly differ from that with the ordinary forklift.

Therefore, control is effected by the following system to give the same feeling as with the ordinary forklift. That is, when the brake pedal 33 is pressed, the amount of travel is detected by the rotation sensor 34; thus, the brake signal 62 is fed into the controller 31. Depending on this brake signal 62, travel instruction signals 52 and 53 are emitted from the controller 31 into both hydraulic pumps 26A and 26B, respectively; thus, the swash plate angles of the hydraulic pumps 26A and 26B are controlled. That is, the speed at which the swash plate angle is returned to 0° is controlled according to the amount of travel of the brake pedal 33, whereby braking is effected.

On this occasion, it is arranged that the swash plate angles of the hydraulic pumps 26A and 26B become 0° a little before a stroke end of the brake pedal 33, and at the stroke end, parking brakes built in the hydraulic motors 21A and 21B are also actuated. And the swash plate angles of the hydraulic pumps 26A and 26B are changed according to the amount of travel of the accelerator pedal 32 by a hydraulic drive system of an automotive type. However, it is arranged that when the accelerator pedal 32 is released, the swash plate angles slowly return to 0°. In addition, the brake circuit is given a top priority.

Thus, the hydraulically driven forklift can be arranged suitably from the viewpoint of cost and space, wherein the hydraulic brake provided by the hydraulic drive system can be effectively used as the service brake, such arrangement being also applicable to the type in which the hydraulic motors 21A and 21B are directly attached to the front wheels 3A and 3B. Further, as in ordinary torque converter type forklifts, inching operation can also be effected by using the brake pedal 33.

FIG. 6 shows diagrams for explaining examples of control (brake characteristics). That is, FIG. 6(A) shows a brake potentiometer output range. It is seen that the brake begins to work at 1.5 V and that maximum deceleration appears at 3.5 V, that when the brake voltage is between 3.5 V and 4.5 V, the brake characteristics remain the same as those when it is at 3.5 V, that if the brake voltage is below 0.5 V or above 4.5 V, it is decided that abnormality (broken wire) is found and the operation should be stopped immediately, and that if the brake voltage is above 1.5 V when the key switch is turned on, it is decided that a malfunction in brake return is found and the travel is disabled until the brake voltage becomes less than 1.5 V.

Further, FIG. 6(B) shows the deceleration time obtained when the brake pedal is pressed with the accelerator pedal released. And FIG. 6(C) shows a situation where the brake pedal is pressed to the position of 2.5 V two seconds after the release of the accelerator pedal and then the brake pedal is released two seconds later.

Further, FIG. 6(D) shows the characteristics obtained when the brake pedal is pressed while pressing the accelerator pedal, wherein 100% refers to the time the brake pedal is not pressed. Further, FIG. 6(E) shows the deceleration time obtained when the accelerator pedal is released.

In the embodiment described above, the turning caster system adapted to turn in a follow-up manner is employed for the pair of right and left rear wheels 4A and 4B. However, out of the pair of right and left rear wheels 4A and 4B, one rear wheel 4 may be of a steering type in which it is forcefully turned by a cylinder or the like through the steering wheel and the other rear wheel 4 may be of the turning caster type. In this case, the steering angle of one rear wheel 4 is fed back to control the hydraulic pumps 26A and 26B; thus the rpm's 58 and 59 of the hydraulic motors 21A and 21B are controlled so as to effect linear travel and turning.

In addition, in the embodiment described above, the change of traveling speed during a turn is made by controlling the rpm's 58 and 59 of the hydraulic motors 21A and 21B according to the turning angle of the steering wheel 16.

In the embodiment above, the change of traveling speed is made on the basis of the position signal 61 resulting from the turning angle of the steering wheel 16. In the type using a steering mechanism for the rear wheels 4A and 4B, however, said change may be made on the basis of the turning angle of the rear wheels 4A and 4B as in the case of ordinary forklifts.

That is, said change can be made by controlling the swash plates of hydraulic pumps 26A and 26B by the detection signal resulting from the turning angle of the rear wheels 4A and 4B (the turning angle of the steering wheel 16), and controlling the rpm's 58 and 59 and the directions of rotation of the hydraulic motors 21A and 21B. In this case, the position of the turning center is determined the turning angle of the rear wheels 4A and 4B, and the controller 31 controls accordingly.

What is claimed is:

1. A hydraulically driven forklift having a vehicle body provided with a pair of right and left front wheels and a pair of right and left rear wheels, and a mast and forks disposed at a front end of the vehicle body, comprising:

the front wheels respectively operably connected to drive shafts of hydraulic motors attached to the vehicle body, the vehicle body provided with two hydraulic pumps driven by an engine, each hydraulic pump corresponding to and being connected to one of the hydraulic motors, and the rear wheels provided to be turnable around vertical axes with respect to the vehicle body, hydraulic motor flow rate being decreased according to a turning angle of a steering wheel during a turn, thereby to reduce overall traveling speed of the forklift.

2. A hydraulically driven forklift having a vehicle body provided with a pair of right and left front wheels and a pair of right and left rear wheels, and a mast and forks disposed at a front end of the vehicle body, comprising:

the front wheels respectively operably connected to drive shafts of hydraulic motors attached to the vehicle body, the vehicle body provided with two hydraulic pumps driven by an engine, each hydraulic pump corresponding to and being connected to one of the hydraulic motors, and the rear wheels provided to be turnable around vertical axes with respect to the vehicle body, hydraulic motor flow rate being decreased according to turning angles of rear wheels during a turn, thereby to reduce overall traveling speed of the forklift.

3. A hydraulically driven forklift having a vehicle body provided with a pair of right and left front wheels and a pair of right and left rear wheels, and a mast and forks disposed at a front end of the vehicle body, comprising:

the front wheels respectively operably connected to drive shafts of hydraulic motors attached to the vehicle body, the vehicle body provided with two hydraulic pumps driven by an engine, each hydraulic pump corresponding to and being connected to one of the hydraulic motors, and the rear wheels provided to be turnable around vertical axes with respect to the vehicle body, wherein the hydraulic pumps are electrically controlled and arranged to control swash plate angles based on a travel instruction signal from a controller, the arrangement being such that the travel instruction signal is emitted from the controller to the hydraulic pumps by feeding to the controller a detection signal from a detector for detecting an amount of travel of a brake pedal.

4. The hydraulic driven forklift as set forth in claim 3, wherein time required for the swash plate angles to reach 0 degree is controlled based on the amount of travel of the brake pedal.

5. A hydraulically driven forklift having a vehicle body provided with a pair of right and left front wheels and a pair of right and left rear wheels, and a mast and forks disposed at a front end of the vehicle body, comprising:

the front wheels respectively operably connected to drive shafts of hydraulic motors attached to the vehicle body, the vehicle body provided with two hydraulic pumps driven by an engine, each hydraulic pump corresponding to and being connected to one of the hydraulic motors, and the rear wheels provided to be turnable around vertical axes with respect to the vehicle body, capacity of the hydraulic motors being increased according to a turning angle of a steering wheel during a turn, thereby to reduce overall traveling speed of the forklift.

6. A hydraulically driven forklift having a vehicle body provided with a pair of right and Left front wheels and a pair of right and left rear wheels, and a mast and forks disposed at a front end of the vehicle body, comprising:

the front wheels respectively operably connected to drive shafts of hydraulic motors attached to the vehicle body, the vehicle body provided with two hydraulic pumps driven by an engine, each hydraulic pump corresponding to and being connected to one of the hydraulic motors, and the rear wheels provided to be turnable around vertical axes with respect to the vehicle body, capacity of the hydraulic motors being increased according to turning angles of rear wheels during a turn, thereby to reduce overall traveling speed of the forklift.

* * * * *